United States Patent
Larson et al.

(10) Patent No.: US 12,031,587 B2
(45) Date of Patent: Jul. 9, 2024

(54) DAMPER CONTROLLED WRAP SPRING CLUTCH

(71) Applicant: Reell Precision Manufacturing Corporation, St. Paul, MN (US)

(72) Inventors: George Larson, Roseville, MN (US); Benjamin Anderson, Scandia, MN (US)

(73) Assignee: Reell Precision Manufacturing Corporation, St. Paul, MN (US)

( * ) Notice: Subject to any disclaimer, the term of this patent is extended or adjusted under 35 U.S.C. 154(b) by 20 days.

(21) Appl. No.: 17/796,476

(22) PCT Filed: Feb. 1, 2021

(86) PCT No.: PCT/US2021/016062
§ 371 (c)(1),
(2) Date: Jul. 29, 2022

(87) PCT Pub. No.: WO2021/155359
PCT Pub. Date: Aug. 5, 2021

(65) Prior Publication Data
US 2023/0250853 A1    Aug. 10, 2023

Related U.S. Application Data

(60) Provisional application No. 62/968,649, filed on Jan. 31, 2020.

(51) Int. Cl.
*F16D 13/08* (2006.01)
*F16D 41/20* (2006.01)

(52) U.S. Cl.
CPC ........... *F16D 13/08* (2013.01); *F16D 41/206* (2013.01)

(58) Field of Classification Search
CPC ......... F16D 13/08; F16D 41/206; F16D 43/04
See application file for complete search history.

(56) References Cited

U.S. PATENT DOCUMENTS

| | | | |
|---|---|---|---|
| 3,394,785 A | 7/1968 | Crutcher, III et al. | |
| 3,631,951 A | 1/1972 | Quenneville | |

(Continued)

FOREIGN PATENT DOCUMENTS

| | | |
|---|---|---|
| CN | 1612981 | 5/2005 |
| DE | 10 2010 022 891 | 12/2011 |

(Continued)

OTHER PUBLICATIONS

International Search Report and Written Opinion dated May 27, 2021 in PCT/US2021/016062.

*Primary Examiner* — Jacob S. Scott
*Assistant Examiner* — Farhana Pervin
(74) *Attorney, Agent, or Firm* — Dicke, Billig & Czaja, PLLC

(57) ABSTRACT

One aspect is a wrap spring clutch with a rotatable input and a spring having a first and a second end and having an equilibrium state and a flexed state, the spring engaged with the input through one of the first and second ends such that the spring rotates with the input and with an input torque transmitted exclusively through one of the first and second ends when the input rotates. A damper mechanism is engaged with one of the first and second ends such that the damper mechanism causes the spring to change from its equilibrium to its flexed state when the input transitions from stationary to rotational, and such that the damper mechanism allows the spring to change from its flexed to its equilibrium state when the input transitions from rotational to stationary. A rotatable output is positioned relative to the spring such that the output synchronously rotates with the (Continued)

input when the spring is in its flexed state and rotates independently of the input when the spring is in its equilibrium state.

19 Claims, 25 Drawing Sheets

(56) References Cited

U.S. PATENT DOCUMENTS

| | | |
|---|---|---|
| 3,987,880 A | 10/1976 | Holland-Letz et al. |
| 4,263,995 A | 4/1981 | Wahlstedt |
| 4,433,765 A | 2/1984 | Rude et al. |
| 4,574,423 A | 3/1986 | Ito et al. |
| 4,830,151 A | 5/1989 | Numata |
| 5,031,745 A | 7/1991 | Nishimura |
| 5,133,437 A | 7/1992 | Larson |
| 5,165,507 A | 11/1992 | Ohshima |
| 5,170,867 A | 12/1992 | Ojima et al. |
| 5,257,852 A | 11/1993 | Tsuneki et al. |
| 5,464,083 A | 11/1995 | Arnold et al. |
| 5,697,125 A | 12/1997 | Gannon |
| 5,909,791 A | 6/1999 | DiStefano |
| 5,950,783 A | 9/1999 | Cahill |
| 6,637,571 B2 | 10/2003 | Arnold et al. |
| 6,866,588 B2 | 3/2005 | Doornbos |
| 7,478,575 B2 | 1/2009 | Revelis |
| 7,614,262 B2 | 11/2009 | Chang et al. |
| 7,878,315 B2 | 2/2011 | Saito et al. |
| 8,021,253 B2 | 9/2011 | Dell et al. |
| 8,286,770 B2 | 10/2012 | Scheck et al. |
| 9,651,099 B2 | 5/2017 | Antchak et al. |
| 2003/0042099 A1* | 3/2003 | Arnold .......... F16D 43/00 192/81 C |
| 2003/0178276 A1* | 9/2003 | Fraczek ........... E06B 9/44 192/223.4 |

FOREIGN PATENT DOCUMENTS

| | | |
|---|---|---|
| EP | 1371873 | 12/2003 |
| EP | 2462299 | 6/2012 |
| GB | 1 475 132 | 6/1977 |
| WO | 2011/015497 | 2/2011 |

* cited by examiner

DAMPER CONTROLLED WRAP SPRING CLUTCH

CROSS-REFERENCE TO RELATED APPLICATIONS

This Utility Patent Application claims priority under 35 U.S.C. § 371 to International Application Serial No. PCT/US2021/016062, filed Feb. 1, 2021, which claims priority to U.S. Application Ser. No. 62/968,649, filed Jan. 31, 2020, both of which are incorporated herein by reference in its entirety.

BACKGROUND

Clutches are used for many applications and come in many varieties throughout industry. One specific version of a clutch is a wrap spring clutch that is activated by a damper. The damper activation allows the clutch to change states as the input changes from stationary to rotating. Features of the input engaging clutch include disengaging the clutch without movement of the input or output, while the clutch is carrying a load. These clutches can be unidirectional or bi-directional. A common application for a bi-directional clutch design is a replacement for an electromagnetic friction disc clutch. A unidirectional clutch typically utilizes cross over hub wrap spring torque transmission and a bi-directional clutch utilizes two sets of cross over hubs. However, such known clutch designs have a high part count and require precise assembly, such that they are typically not cost competitive enough in order to be used. Therefore, there is a need for a new design of an input engaging clutch that can create the bidirectional or unidirectional function in a simplified mechanism in order meet the cost expectations of these applications.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the invention. The following detailed description, therefore, is not to be taken in a limiting sense, and the scope of the invention is defined by the appended claims.

It is to be understood that the features of the various exemplary embodiments described herein may be combined with each other, unless specifically noted otherwise.

Figure 1:
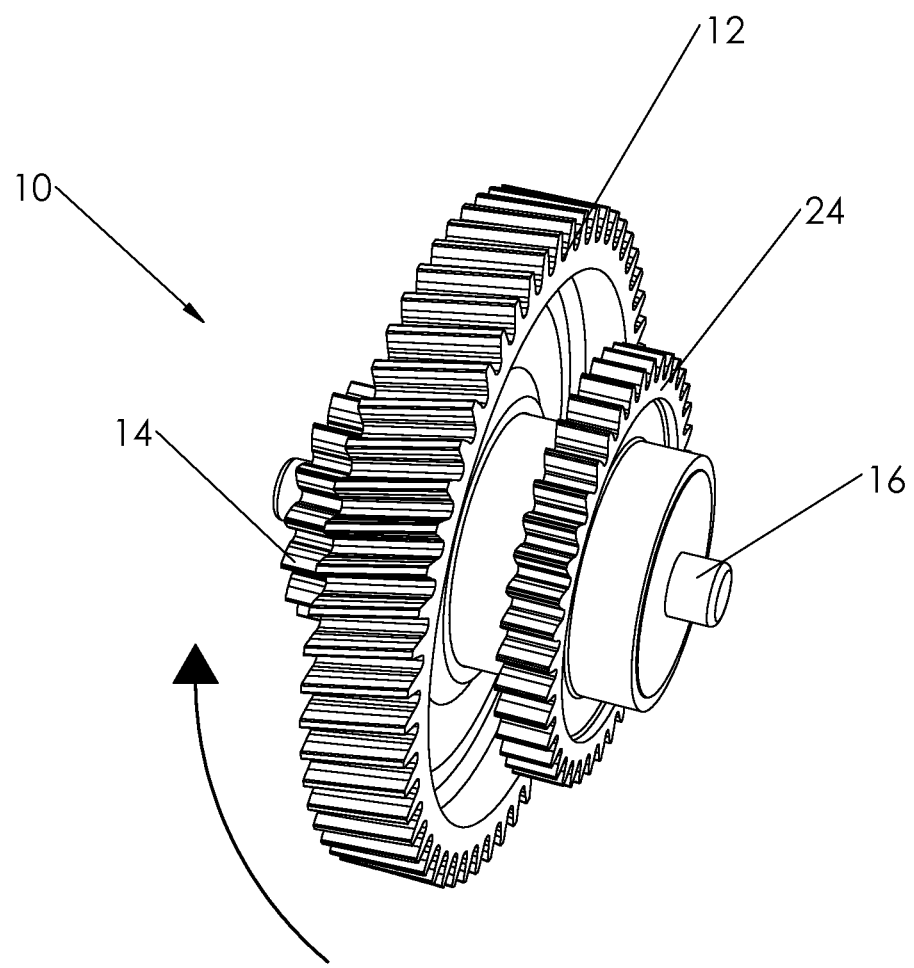
FIG. 1 illustrates a perspective view of a wrap spring clutch in accordance with one embodiment.
Figure 2:
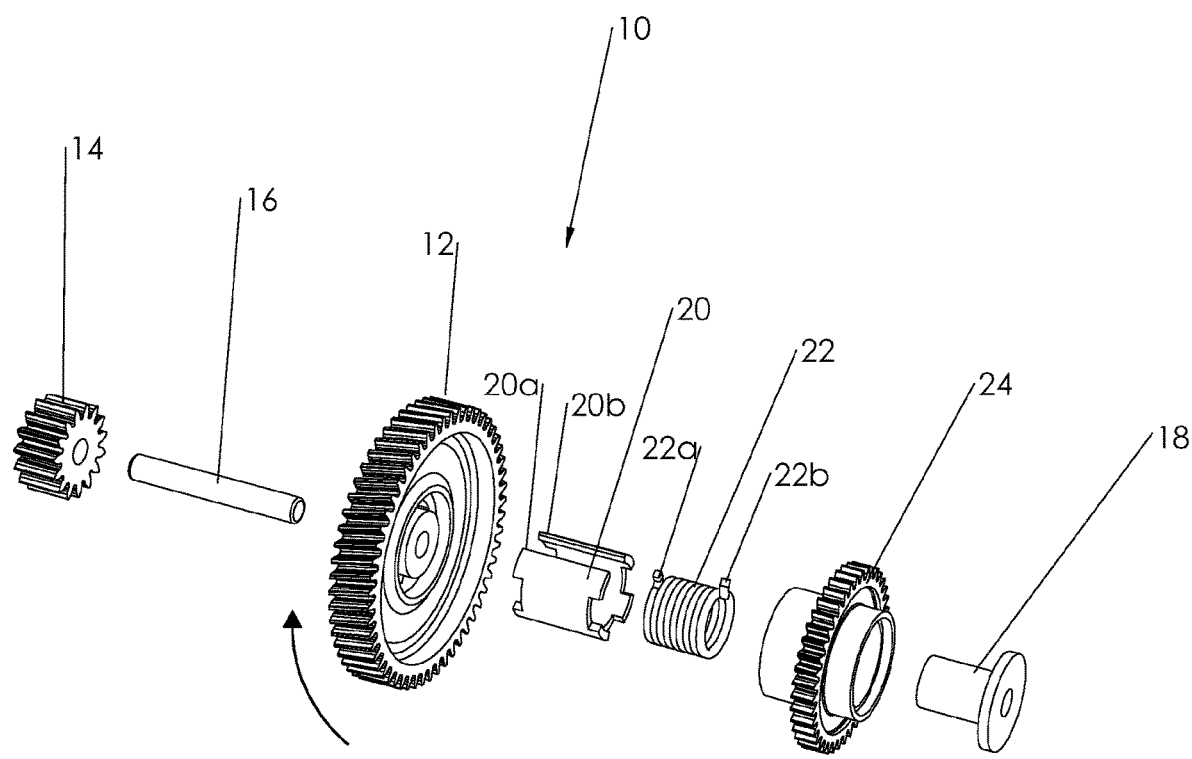
FIG. 2 illustrates an exploded view of the wrap spring clutch of FIG. 1 in accordance with one embodiment.
Figure 3:
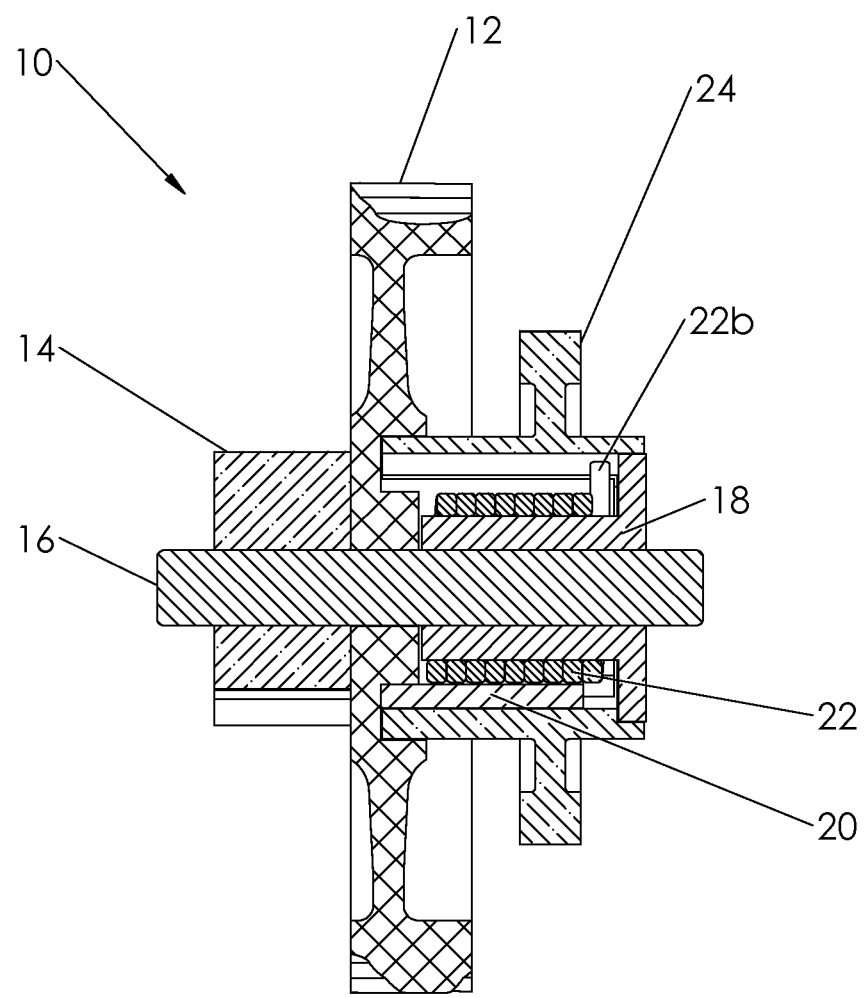
FIG. 3 illustrates a sectional view of the wrap spring clutch of FIGS. 1 and 2 in accordance with one embodiment.

FIG. 1 illustrates a wrap spring clutch 10 in accordance with one embodiment. FIG. 2 further illustrates an exploded view of wrap spring clutch 10, illustrating further components not visible in FIG. 1. FIG. 3 illustrates a sectional view of fully assembled wrap spring clutch 10. In one embodiment, wrap spring clutch 10 includes an input 12 and an output 14. In one embodiment, a shaft 16 and an output hub 18 are coupled to output 14, and a slotted driver 20 is coupled to input 12. In one embodiment, slotted driver 20 has a first drive surface 20a and a second drive surface 20b.

A wrap spring 22 is a helical-wound spring with a relaxed or equilibrium condition defining a relaxed internal diameter. Wrap spring 22 is helically wrapped over output hub 18, and includes first spring end 22a and second spring end 22b. Output hub 18 has an external hub diameter that is less than the internal diameter of wrap spring 22 in its relaxed condition. Consequently, when wrap spring 22 in its relaxed condition is placed over output hub 18, output hub 18 can rotate within wrap spring 22 without interference therewith. In one embodiment, each of first and second spring ends 22a and 22b are spring toes, which are bent outward away from the helically wrapped portion of spring 22 as is discussed further below.

Figure 4:
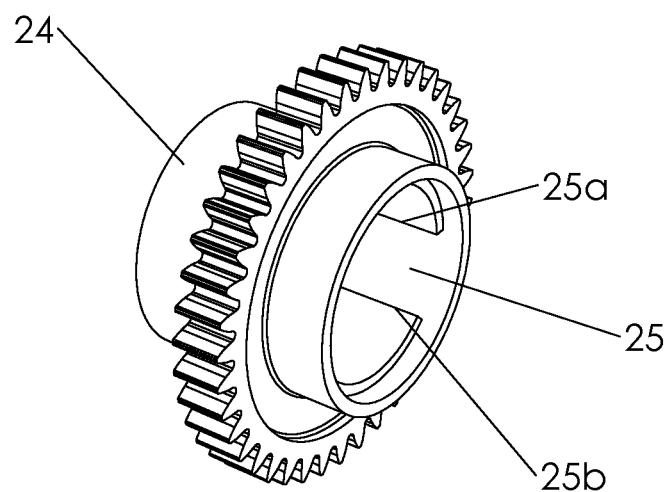
FIG. 4 illustrates a perspective view of a control with slot in accordance with one embodiment.

In one embodiment, a control 24 is provided over output hub 18 and wrap spring 22. FIG. 4 illustrates a further view of control 24, which in one embodiment includes control slot 25. In one embodiment, control slot 25 has a first edge 25a and a second edge 25b. In one embodiment, control 24 is controllably engaged with first or second spring ends 22a/22b via slot 25. Depending on the relative directions of rotation, first or second spring ends 22a/22b will engage first or second edge 25a/25b via the bent spring toe.

Figure 5:
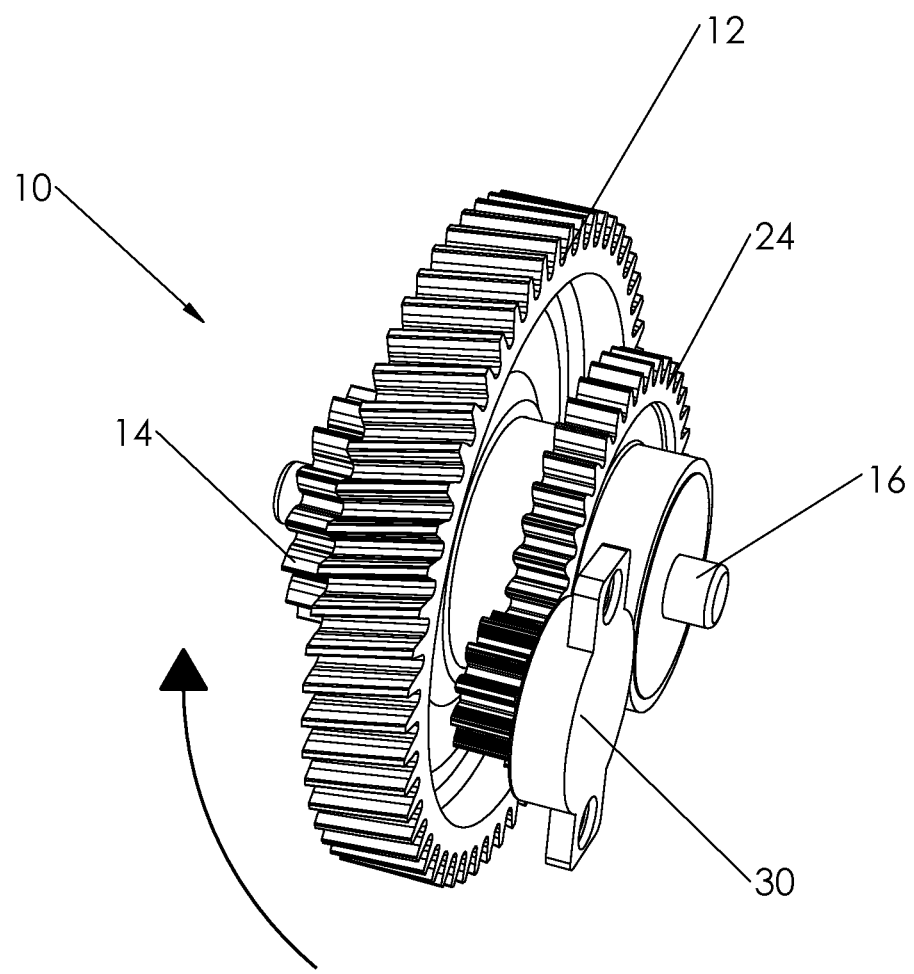
FIG. 5 illustrates a perspective view of a wrap spring clutch with a rotary damper in accordance with one embodiment.

As illustrated in FIG. 5, control 24 is engaged with a dampening force. For example, in one embodiment, control 24 is engaged with a rotary damper 30, for example via teeth on an outer edge of control 24 and on rotary damper 30, which are engaged. Rotary damper 30 provides a relatively steady resistance to the rotating of control 24. Other means of providing a dampening force or drag torque are well known, such as providing a surrounding viscous fluid that will provide a drag or controlled resistance to rotation control 24. Because the dampening control forces are low, the area to which it is applied can be relatively small, such as to the bent spring toe.

In one embodiment, wrap spring clutch 10 allows a change of a clutch state—engaged or disengaged—regardless of loading of wrap spring clutch 10. When input 12 is rotated in either direction, its rotation engages wrap spring 22 at one of its ends 22a/22b through slotted driver 20. Simultaneously, control 24 engages the opposite end 22a/22b, and due to the dampening force on control 24, wrap spring 22 wraps down on output hub 18, such that input 12 and output 14 rotate together. When input 12 is not rotated, the spring force stored in wrap spring 22 allows the wrap spring to unwind off the output hub 18, such that input 12 and output 12 are disengaged. The relative spring force stored in wrap spring 22 and the relative amount of drag force on control 24 (such as by rotary damper 30) can be adjusted so that the change of the clutch state can be readily controlled.

The drag force provided on control 24 by damper 30 is enough to overcome the spring force in wrap spring 22 to cause the wrap spring 22 to change from its equilibrium state to its flexed state when input 12 is rotating. The amount of spring force in wrap spring 22 is enough to overcome the drag force provided on control 24 by damper 30 to cause the wrap spring 22 to change from its flexed state to its equilibrium state when input 12 is no longer rotating.

In operation, wrap spring clutch 10 can alternatively engage and disengage input 12 to output 14. For example, input 12 has two modes: it will either be rotating in one direction or it will not be rotating and held stationary. In one embodiment, input 12 may be coupled to a motor that can be turned on and off to alternatively provide a rotating force in either or both directions, or no rotating force to input 12. Output 14 may then be coupled to a device, such as a gear that will move a door or other movable device. When the motor coupled to input 12 is off, wrap spring clutch 10 is disengaged, such that input 12 and output 14 are not coupled together. Input 12 is in a stationary mode when the motor is off. When the motor is turned on, however, input 12 changes to a rotating mode. With the motor on, input 12 is forced to rotate causing input engaging clutch 10 to be engaged, that is, input 12 and output 14 are coupled, such that output 14 rotates with input 12.

In one embodiment, when input 12 is rotated in the clockwise direction indicated in the arrow on FIGS. 1 and 2, first drive surface 20a of slotted driver 20 engages first end 22a of wrap spring 22 and drives it in the indicated clockwise direction. In one embodiment, first end 22a of wrap spring 22 is a spring toe that is bent outward from the helical turns of wrap spring 22 such that it is readily engaged by first drive surface 20a of slotted driver 20. As input 12 and spring 22 rotate, the second end 22b, which in one embodiment is a spring toe bent outward, comes into engagement with second edge 25b of slot 25 within control 24. The spring still in its relaxed state begins to rotate control 24 along with the input. When the amount of drag force on control 24 is sufficient to overcome the energy stored in wrap spring 22, second edge 25b of slot 25 will push second spring end 22b in the counterclockwise direction, opposite the arrow in FIGS. 1 and 2, causing wrap spring 22 to transition from its equilibrium state to its flexed state and wrap down onto output hub 18. As such, input 12 and output 14 rotate together.

When input 12 is no longer being rotated, the energy stored in wrap spring 22 is sufficient to overcome the amount of drag force on control 24 causing wrap spring 22 to transition from its flexed state to its equilibrium state and wrap open off output hub 18. In such case, input 12 and output 14 are disconnected and output 14 will rotate independent of input 12.

In one embodiment, when input 12 is rotated in the counterclockwise direction, opposite that indicated in the arrow on FIGS. 1 and 2, second drive surface 20b of slotted driver engages second end 22b of wrap spring 22 and drives it in the counterclockwise direction. As input 12 and spring 22 rotate, the first end 22a, which in one embodiment is a spring toe bent outward, comes into engagement with first edge 25a of slot 25 within control 24. The spring still in its relaxed state begins to rotate control 24 along with the input. When the amount of drag force on control 24 is sufficient to overcome the energy stored in wrap spring 22, first edge 25a of slot 25 will push first spring end 22a in the clockwise direction indicated by the arrow in FIGS. 1 and 2, causing wrap spring 22 to transition from its equilibrium state to its flexed state and wrap down onto output hub 18. As such, input 12 and output 14 rotate together.

Prior input engaging clutches, such as that described in U.S. Pat. No. 6,637,571, which is incorporated herein by reference, required two hubs over which the wrap spring crosses. This type of cross-over clutch transfers torque from one hub to another via a spring. This type of design requires multiple hubs and minimal axial clearance to prevent the spring from wedging into gaps and causing failure over life of the clutch. Present embodiments eliminate the use of two hubs required in prior embodiments, and also does away with the precise assembly required for a cross over spring clutch of prior embodiments, which require the load precisely cross over from an input hub to an output hub. In one embodiment, wrap spring clutch 10 has the input engaging feature is combined with a toe drive spring, such that clutching loads are transmitted through the end of wrap spring 22. This results in both reduced part count and reduced complications in assembly.

Figure 6:
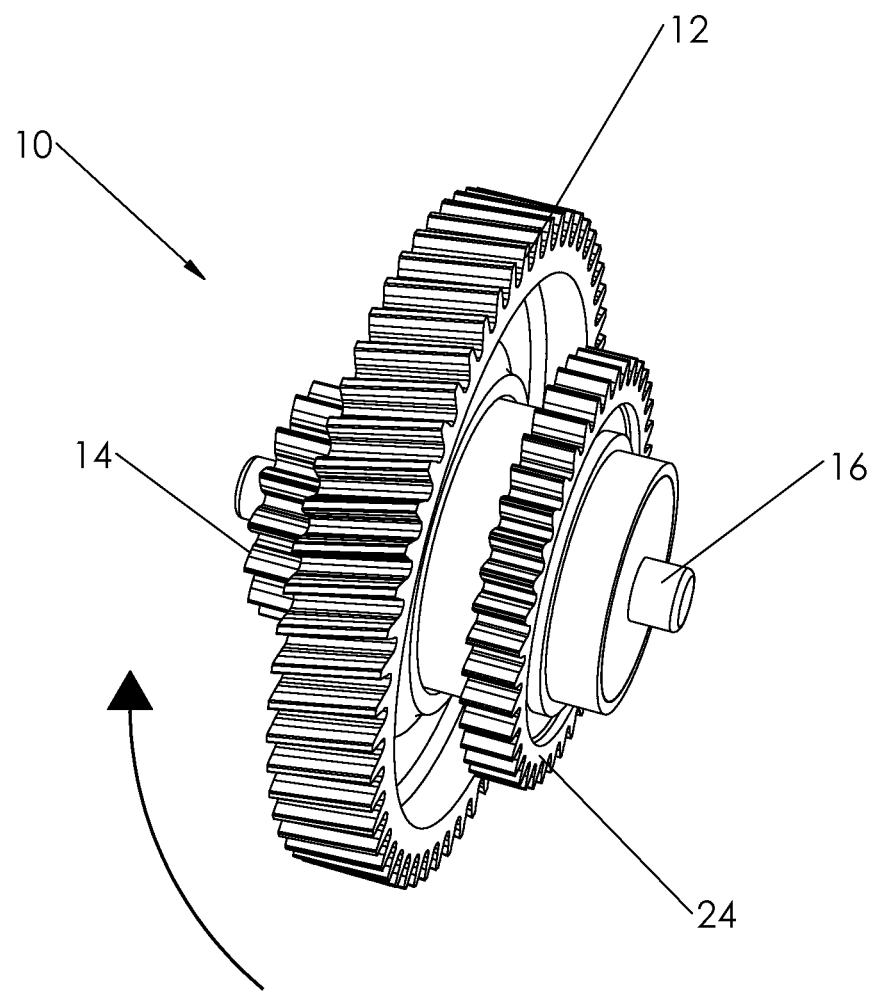
FIG. 6 illustrates a perspective view of a wrap spring clutch in accordance with one embodiment.
Figure 7:
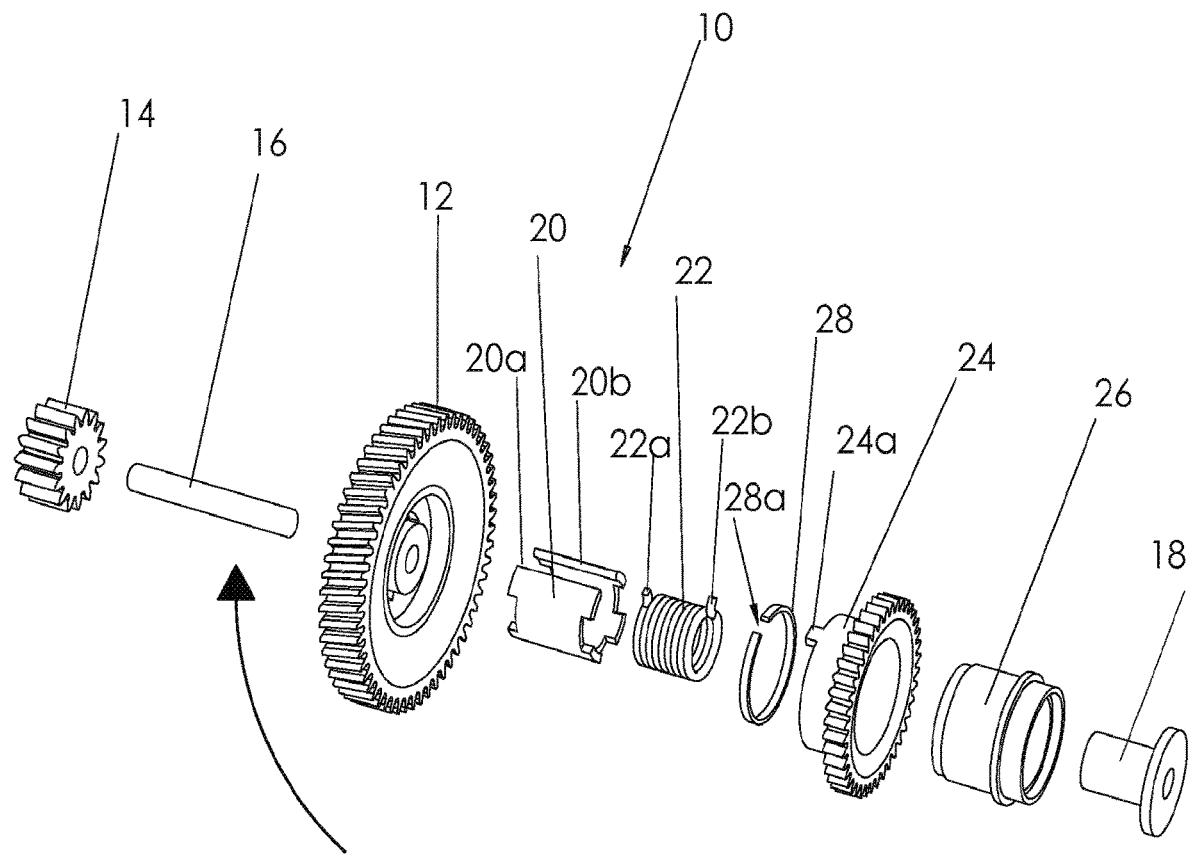
FIG. 7 illustrates an exploded view of the wrap spring clutch in FIG. 6 in accordance with one embodiment.
Figure 8A:
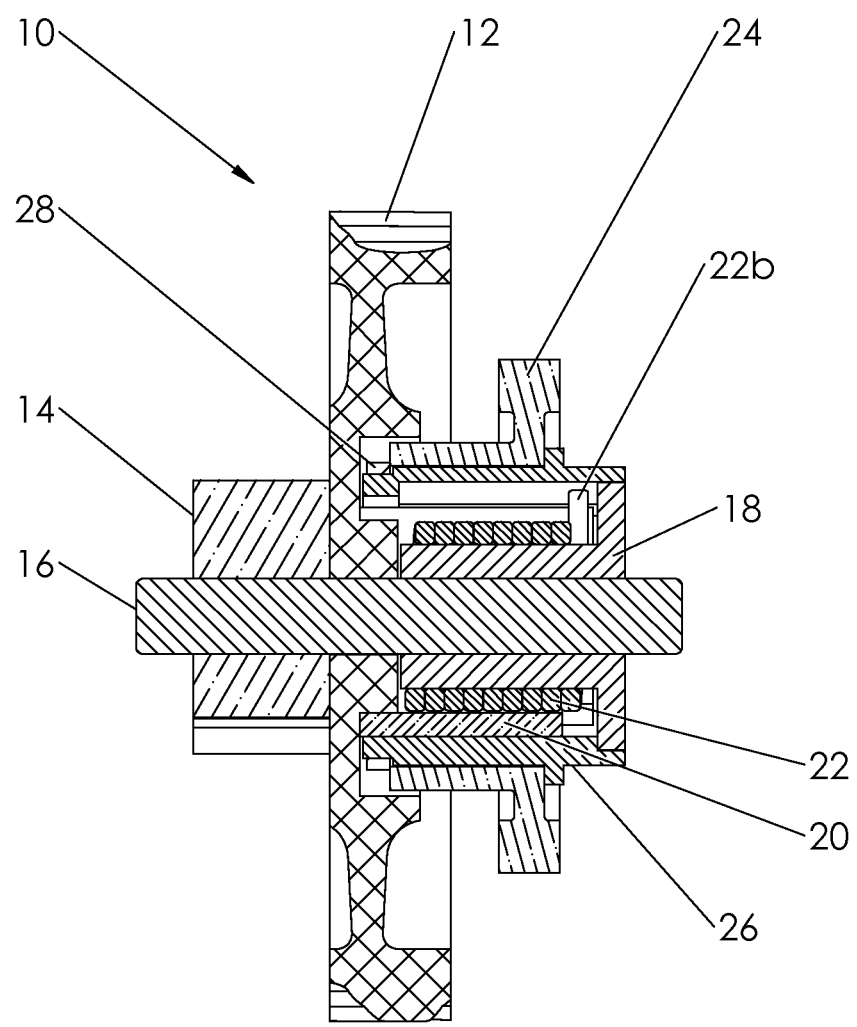
FIG. 8A illustrates a sectional view of the wrap spring clutch of FIGS. 6 and 7 in accordance with one embodiment.

FIG. 6 illustrates a wrap spring clutch 10 in accordance with one embodiment. FIG. 7 further illustrates an exploded view of wrap spring clutch 10, illustrating further components not visible in FIG. 6. FIG. 8A illustrates a sectional view of fully assembled wrap spring clutch 10. Wrap spring clutch 10 of FIG. 6 to FIG. 8A is analogous to that in FIGS. 1-5. In one embodiment, wrap spring clutch 10 includes an input 12 and an output 14. In one embodiment, output 14 and an output hub 18 are coupled to shaft 16, and a slotted driver 20, with first and second drive surfaces 20a/20b, is coupled to input 12. A wrap spring 22, with first and second spring ends 22a/22b is helically wrapped over output hub 18.

Figure 9:
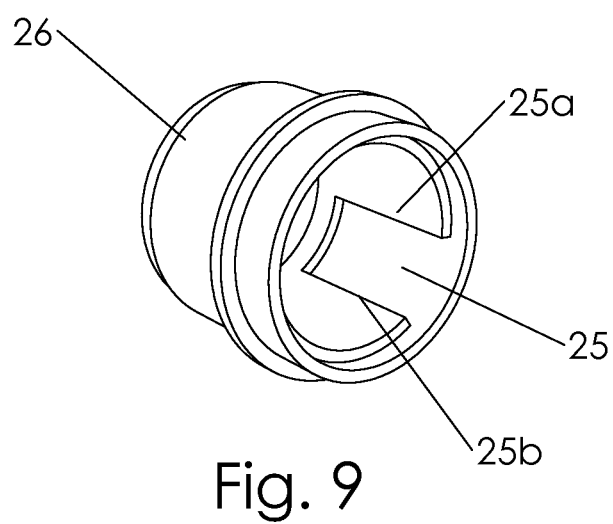
FIG. 9 illustrates a perspective view of a control hub with slot in accordance with one embodiment.

In one embodiment, a control 24, a control hub 26 and a drag spring 28 are provided over output hub 18 and wrap spring 22. In one embodiment of wrap spring clutch 10, control 24 and control hub 26 are selectively coupled together via drag spring 28. In one embodiment, control 24 has a projection 24a, which is configured to be located within slot 28a of drag spring 28 when wrap spring clutch 10 is fully assembled. The addition of drag spring 28 allows further control to assist a drag force from a damper, such as rotary damper 30 illustrated in FIG. 5, to translate that damping force locking control 24 to control hub 26, thereby engaging one of the first and second spring ends 22a/22b with slot 25. Control slot 25, with its first and second edges 25a/25b, is illustrated in FIG. 9.

In operation, wrap spring clutch 10 of FIG. 6 to FIG. 8A functions analogously to that in FIGS. 1-5 with a slight variation of the operation of control 24, control hub 26 and drag spring 28, which is allowed to slip under some conditions. When input 12 is rotated in the clockwise direction indicated in the arrow on FIGS. 6 and 7, first drive surface 20a of slotted driver 20 engages first end 22a of wrap spring 22 and drives it in the indicated clockwise direction. With this rotation, second end 22b, engages second edge 25b of slot 25 within control 24. When the amount of drag force on control 24 (such as from a rotary damper 30 in FIG. 5) is sufficient to overcome the energy stored in wrap spring 22, the drag force translates to control 24 via its external teeth, to drag spring 28 via projection 24a within slot 28a, to control hub 26, such that second edge 25b of slot 25 will push second spring end 22b in the counterclockwise direction, opposite the arrow in FIGS. 6 and 7, causing wrap spring 22 to transition from its equilibrium state to its flexed state and wrap down onto output hub 18. As such, input 12 and output 14 rotate together.

Drag spring 28 limits the amount of force and energy that is transmitted to the damper 30 from input 12. When drag spring 28 slips, it still passes enough energy to keep spring 22 wrapped down, but it reduces some revolutions of the rotary damper.

Figure 8B:
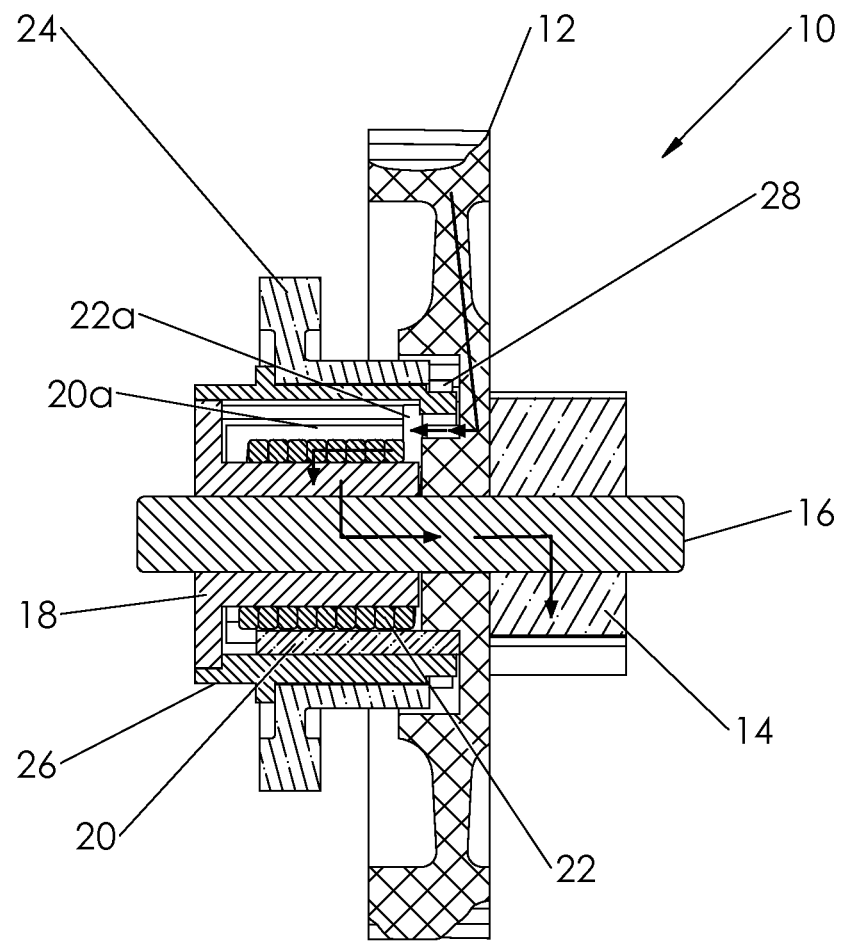
FIGS. 8B-8E illustrates a sectional view of the wrap spring clutch of FIGS. 6 and 7 with a designated torque path in accordance with one embodiment.

FIG. 8B, which is an opposite perspective view relative to FIG. 8A, illustrates arrows indicating the torque path of an engaged clutch 10, when input 12 is driven in the clockwise direction as just described. The rotation of input 12 drives first end 22a of wrap spring 22 via slotted driver 20. Because wrap spring 22 is wrapped down on output hub 18 which is coupled to shaft 16, shaft 16 is accordingly driven. Also, because output 14 is fixed to shaft 16, output 14 is also driven.

Figure 8C:
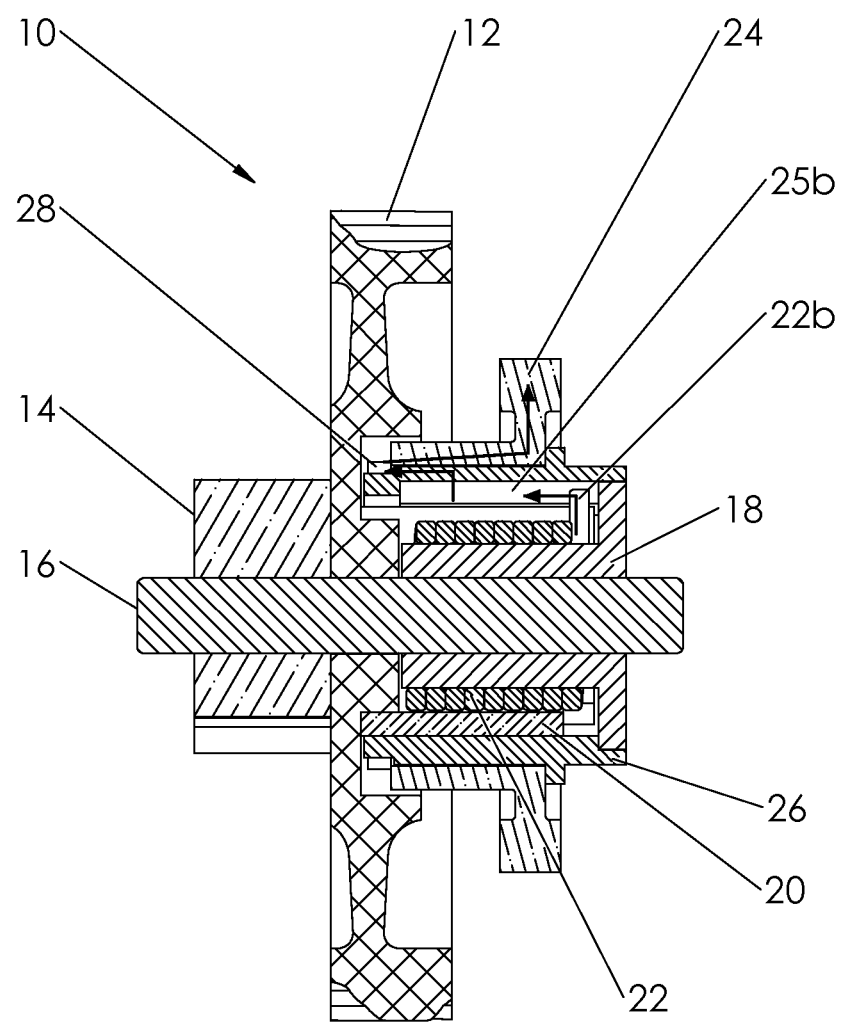

FIG. 8C, which is an opposite perspective view relative to FIG. 8B, illustrates arrows indicating the torque path for the control 24 of an engaged clutch 10, when the input is driven in the clockwise direction as just described. As illustrated, torque transfers from second spring end 22b, to second edge 25b of slot 25 in control hub 26, to drag spring 28, to control 24.

When input 12 is no longer being rotated, the energy stored in wrap spring 22 is sufficient to overcome the amount of drag force on control 24 causing wrap spring 22 to transition from its flexed state to its equilibrium state and wrap open off output hub 18. In such case, input 12 and output 14 are disconnected and output 14 will rotate independent of input 12. With rotary damper 30 engaged with control 24, the drag force acting on control 24 is proportional to the speed of rotation. When there are higher speeds on damper 30, there is a higher force output. The drag force from damper 30 decreases at lower rotational speeds.

When input 12 rotates in the opposite counterclockwise direction, opposite that indicated in the arrow on FIGS. 6 and 7, second drive surface 20b of slotted driver 20 engages second end 22b of wrap spring 22 and drives it in the counterclockwise direction. With this rotation, first end 22a, engages first edge 25a of slot 25 within control 24. When the amount of drag force on control 24 is sufficient to overcome the energy stored in wrap spring 22, the drag force translates to control 24 via its external teeth, to drag spring 28 via projection 24a within slot 28a, to control hub 26, such that second edge 25b of slot 25 will push second spring end 22b in the counterclockwise direction, causing wrap spring 22 to transition from its equilibrium state to its flexed state and wrap down onto output hub 18. As such, input 12 and output 14 rotate together.

Figure 8D:
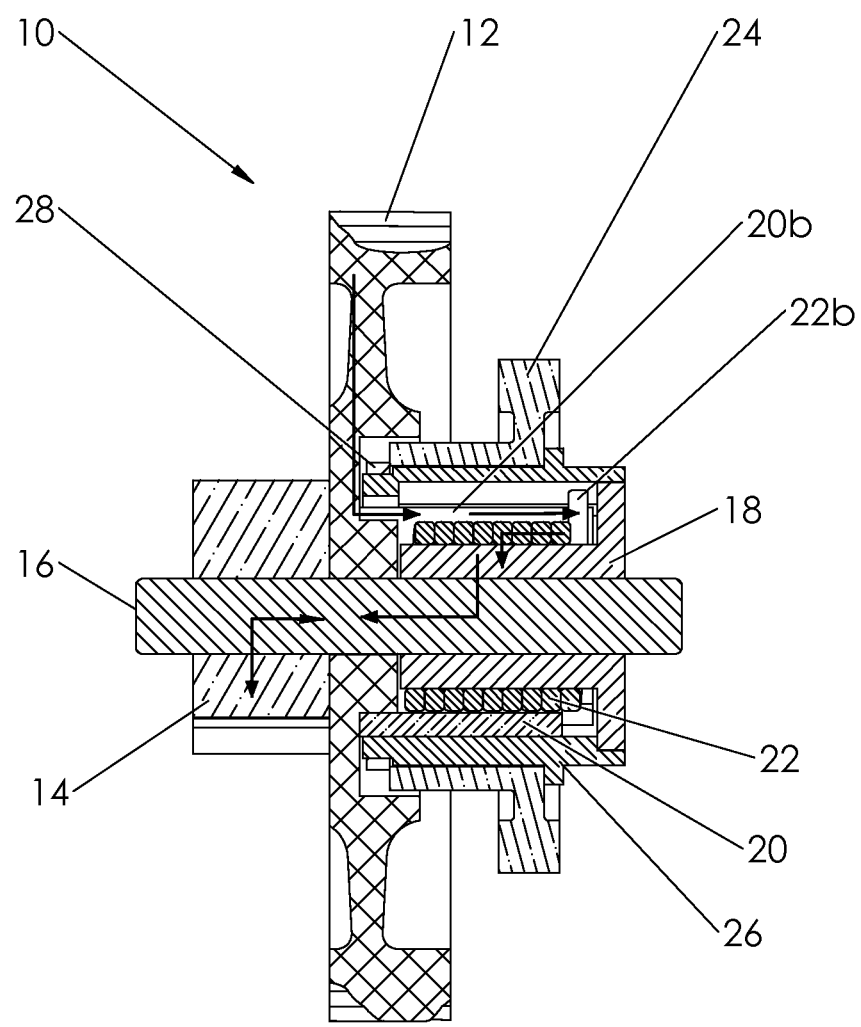

FIG. 8D, which is an opposite perspective view relative to FIG. 8B, illustrates arrows indicating the torque path of an engaged clutch 10, when input 12 is driven in the counterclockwise direction. The rotation of input 12 drives second end 22b of wrap spring 22 via slotted driver 20. Because wrap spring 22 is wrapped down on output hub 18 which is coupled to shaft 16, shaft 16 is accordingly driven. Also, because output 14 is fixed to shaft 16, output 14 is also driven.

Figure 8E:
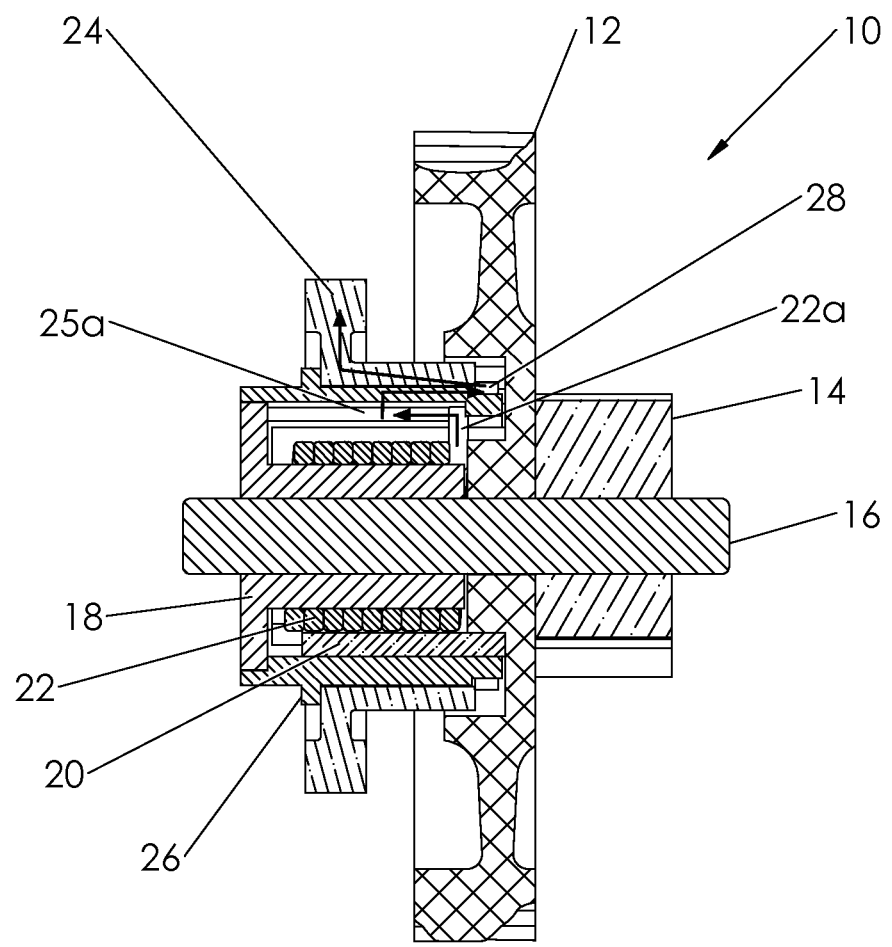

FIG. 8E, which is an opposite perspective view relative to FIG. 8A, illustrates arrows indicating the torque path for the control 24 of an engaged clutch 10, when the input is driven in the counterclockwise direction. As illustrated, torque transfers from first spring end 22a, to first edge 25b of slot 25 in control hub 26, to drag spring 28, to control 24.

Figure 10:
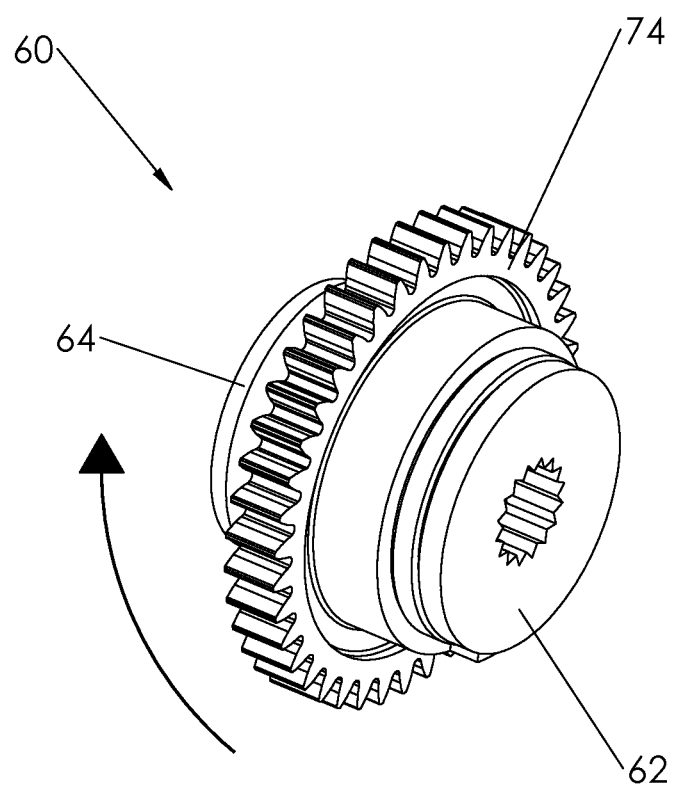
FIG. 10 illustrates a perspective view of a wrap spring clutch in accordance with one embodiment.
Figure 11:
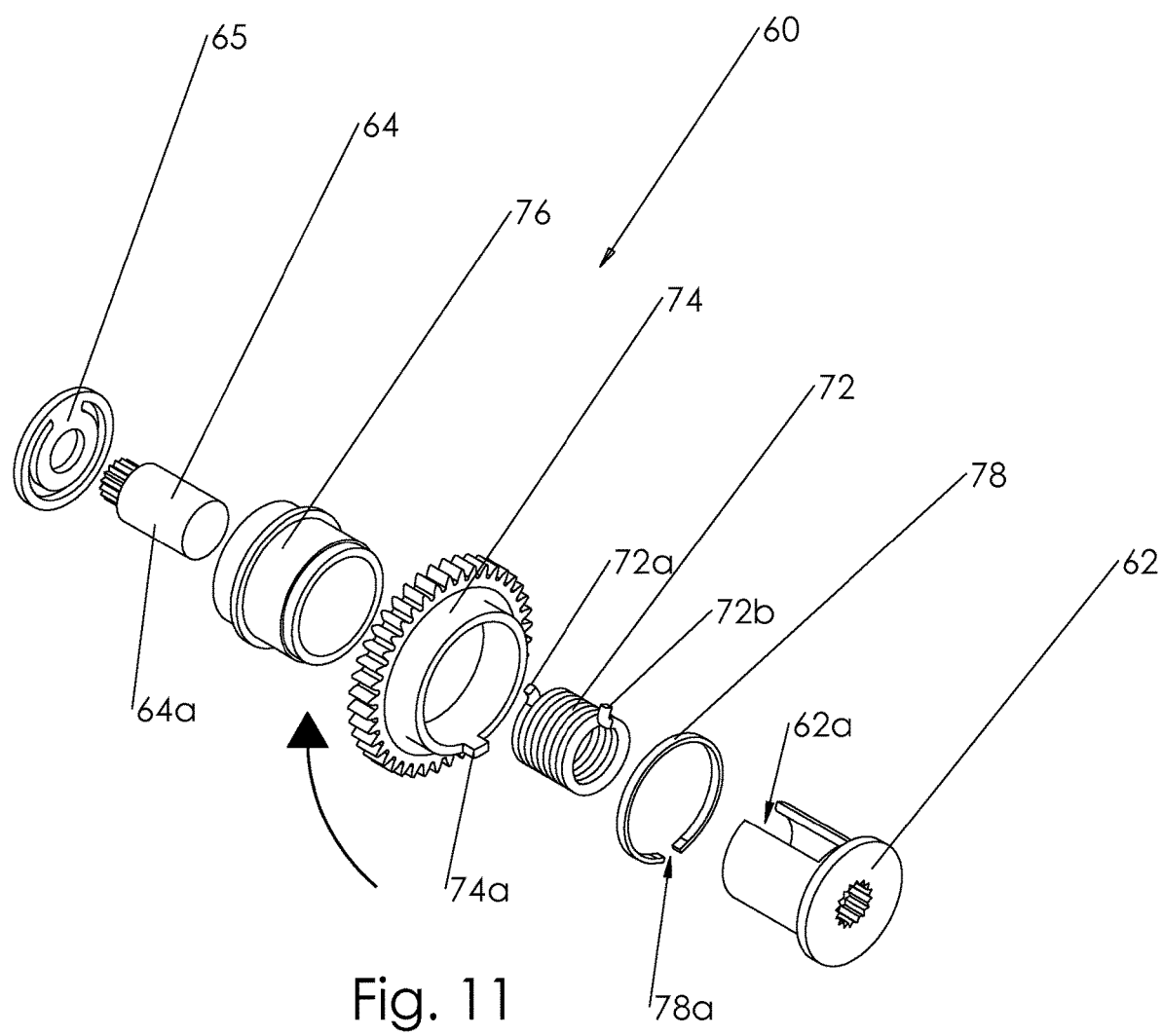
FIG. 11 illustrates an exploded view of the wrap spring clutch of FIG. 10 in accordance with one embodiment.
Figure 12:
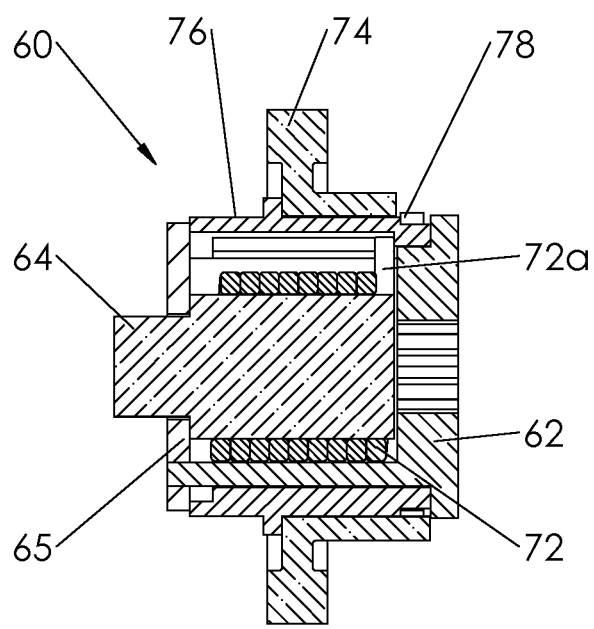
FIG. 12 illustrates a sectional view of the wrap spring clutch of FIGS. 10 and 11 in accordance with one embodiment.

FIG. 10 illustrates a wrap spring clutch 60 in accordance with one embodiment. FIG. 11 further illustrates an exploded view of wrap spring clutch 60, illustrating further components not visible in FIG. 10. FIG. 12 illustrates a sectional view of fully assembled wrap spring clutch 60. Wrap spring clutch 60 of FIGS. 10 to 12 is analogous to wrap spring clutch 10 in FIGS. 1-9, except wrap spring clutch 60 uses spline input and outputs rather than the gear input and output, such that it can be used in a spindle application, for example.

In one embodiment, wrap spring clutch 60 includes an input 62 and an output 64. In one embodiment, output 64 includes an output hub surface 64a, and input 62 includes a slotted driver opening 62a defining drive surfaces on either side of the slot opening. A wrap spring 72, with first and second spring ends 72a/72b is helically wrapped over output hub surface 64a.

In one embodiment, a control 74, a control hub 76 and a drag spring 78 are provided over output 64 and wrap spring 72. In one embodiment of wrap spring clutch 60, control 74 and control hub 76 are selectively coupled together via drag spring 78. In one embodiment, control 74 has a projection 74a, which is configured to be located within slot 78a of drag spring 78 when wrap spring clutch 60 is fully assembled. Drag spring 78 allows further control to assist a drag force from a damper, such as rotary damper 30 illustrated in FIG. 5, to translate that damping force from damper 30 to control 74, to drag spring 78, to control hub 76, and thereby engaging one of the first and second spring ends 72a/72b with a slot in control 74 (analogous to previously described slots 25 illustrated in FIGS. 4 and 9).

In operation, wrap spring clutch 60 of FIGS. 10-12 functions analogously to that in FIGS. 6-8A. When input 62 is rotated in the clockwise direction indicated in the arrow on FIGS. 10 and 11, a drive surface of slotted driver opening 62a engages first end 72a of wrap spring 72 and drives it in the indicated clockwise direction. When the amount of drag force on control 74 (such as from a rotary damper 30 in FIG. 5) is sufficient to overcome the energy stored in wrap spring 72, the drag force is translated from damper 30, to control 74, to drag spring 78, to control hub 76, such that an edge of the slot in control 74 will push second spring end 72b in the counterclockwise direction, opposite the arrow in FIGS. 10 and 11, causing wrap spring 72 to transition from its equilibrium state to its flexed state and wrap down onto output hub surface 64a. As such, input 62 and output 64 rotate together.

When input 62 is no longer being rotated, the energy stored in wrap spring 72 is sufficient to overcome the amount of drag force on control 74 causing wrap spring 72 to transition from its flexed state to its equilibrium state and wrap open off output hub surface 64a. In such case, input 62 and output 64 are disconnected and output 64 will rotate independent of input 62.

When input 62 rotates in the counterclockwise direction, opposite that indicated in the arrow on FIGS. 10 and 11, a drive surface of slotted driver opening 62a engages second end 72b of wrap spring 72 and drives it in the counterclockwise direction. When the amount of drag force on control 74 is sufficient to overcome the energy stored in wrap spring 72, the drag force is translated from damper 30, to drag spring 78, to control hub 76, such that an edge of the slot in control 74 will push first spring end 72a in the counterclockwise direction, causing wrap spring 72 to transition from its equilibrium state to its flexed state and wrap down onto output hub surface 64a. As such, input 62 and output 64 rotate together.

Figure 13:
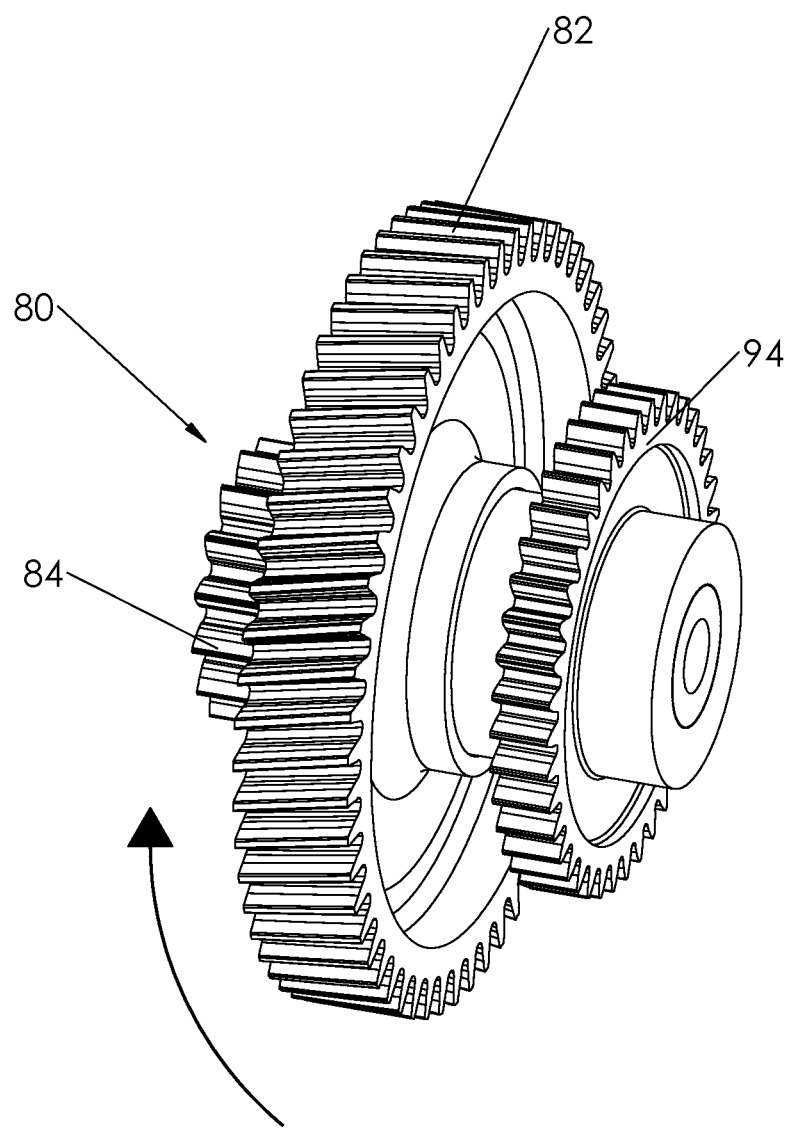
FIG. 13 illustrates a perspective view of a unidirectional wrap spring clutch in accordance with one embodiment.
Figure 14:
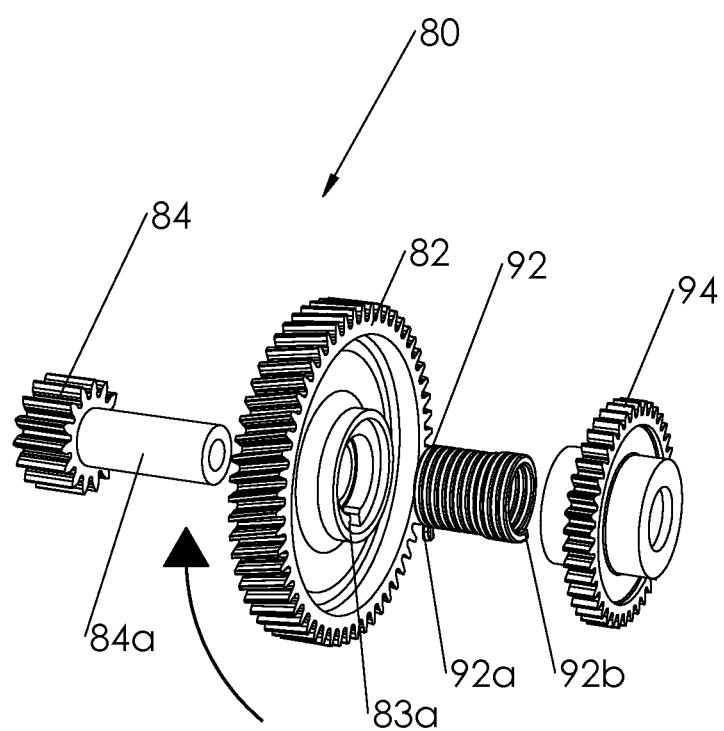
FIG. 14 illustrates an exploded view of the unidirectional wrap spring clutch of FIG. 13 in accordance with one embodiment.
Figure 15:
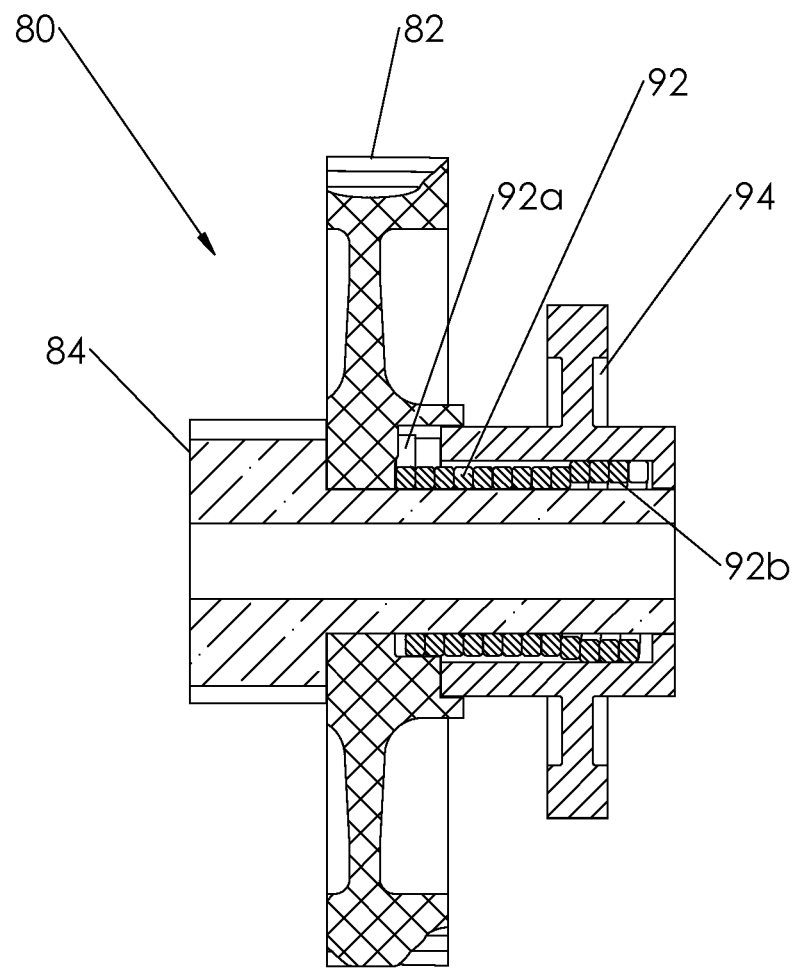
FIG. 15 illustrates a sectional view of the unidirectional wrap spring clutch of FIGS. 13 and 14 in accordance with one embodiment.

FIG. 13 illustrates a wrap spring clutch 80 in accordance with one embodiment. FIG. 14 further illustrates an exploded view of wrap spring clutch 80, illustrating further components not visible in FIG. 13. FIG. 15 illustrates a sectional view of fully assembled wrap spring clutch 80. Whereas previous-described wrap spring clutches 10 and 60 are bidirectional, wrap spring clutch 80 is configured as a unidirectional input clutch such that it operates in a single direction of rotation, either clockwise or counterclockwise. In the illustrated embodiment of FIGS. 13-15, wrap spring clutch 80 is configured so that the input engages in the clockwise direction, indicated by the arrow.

In one embodiment, wrap spring clutch 80 includes an input 82 and an output 84. In one embodiment, output 84 includes an output hub surface 84a, and input 82 includes a spring end slot 83. A wrap spring 92, with first and second spring ends 92a/92b is helically wrapped over output hub surface 84a. In one embodiment, first spring end 92a is spring toe bent outward and assembled within spring end slot 83, such that wrap spring 92 will rotate with rotation of input 82. A control 94 is provided over output hub 84 and wrap spring 92. In one embodiment, control 94 is engaged with a drag force from a damper, such as rotary damper 30 illustrated in FIG. 5, to translate that damping force to control 94, for example, via teeth on the outer perimeter of control 94 and damper 30.

In operation, wrap spring clutch 80 of FIGS. 13-16 functions somewhat analogously to that in prior Figures, except that it operates only with input 82 rotating in a single direction. When input 82 is rotated in the clockwise direction indicated in the arrow on FIGS. 13 and 14, wrap spring 92 also rotates in the clockwise direction by virtue of first spring end 92a being coupled within spring end slot 83. When the amount of drag force on control 94 (such as from a rotary damper in FIG. 5) is sufficient to overcome the energy stored in wrap spring 92, second spring end 92b will cause wrap spring 92 to transition from its equilibrium state to its flexed state and wrapping down onto output hub surface 84a. As such, input 82 and output 84 rotate together.

In one embodiment, the helical wraps of wrap spring 92 will have a larger diameter at second spring end 92b than the rest of wrap spring 92. This is illustrated, for example, in FIG. 15 where the last few turns of wrap spring 92 have a larger diameter at second spring end 92b. While second spring 92b is always engaged with control 94, this method of connection allows for relative motion at a specific torque. Once the torque is exceeded, spring end 92b will slip inside of the bore, while still transmitting enough force to engage the clutch spring wraps. This larger diameter at spring end 92b assists in the engagement of wrap spring 92 with control 94 so that wrap spring 92 wraps down onto output hub surface 84a, and provides damper protection.

When input 82 is no longer being rotated, the energy stored in wrap spring 92 is sufficient to overcome the amount of drag force on control 94 causing wrap spring 92 to transition from its flexed state to its equilibrium state and wrap open off output hub surface 84a. In such case, input 82 and output 84 are disconnected and output 84 will rotate independent of input 82.

Figure 16:
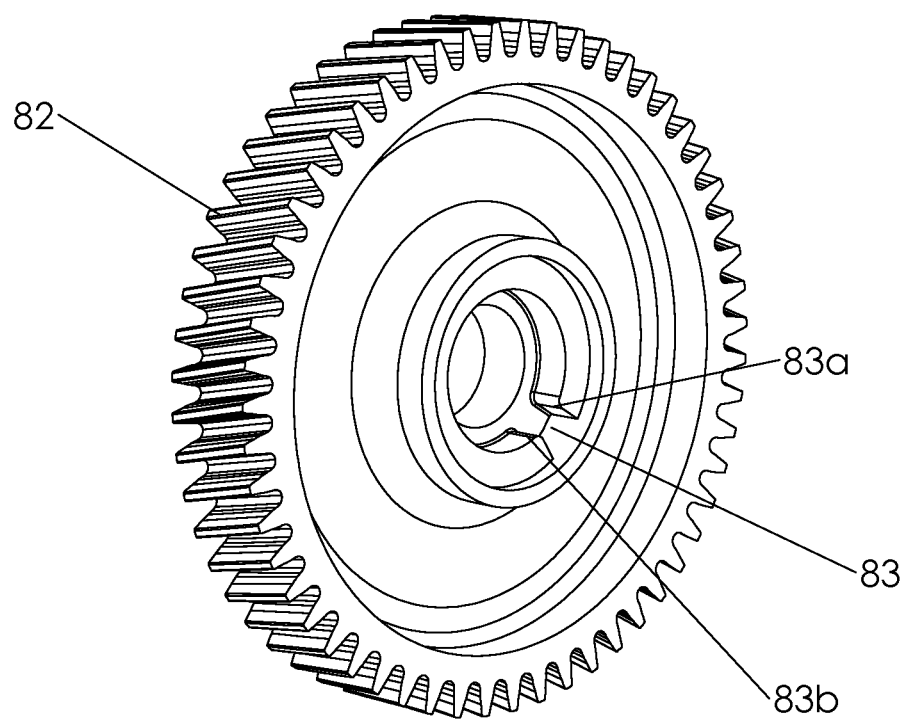
FIG. 16 illustrates a perspective view of an input with spring toe slot in accordance with one embodiment.

FIG. 16 illustrates further detail of input 82. Spring end slot 83 is illustrated and is where first spring end 92a is coupled within. First and second drive surfaces 83a/83b are further illustrated. When wrap spring clutch 80 is configured to engage with input rotation in the clockwise direction (as in FIGS. 13-15), first drive surface 83a will drive the spring toe of first spring end 92a thereby engaging the clutch. As is evident, wrap spring clutch 80 can also be configured to engage with input rotation in the counterclockwise direction by reversing the helical orientation of wrap spring 92, in which case second drive surface 83b will drive the spring toe of first spring end 92a thereby engaging the clutch.

Figure 17:
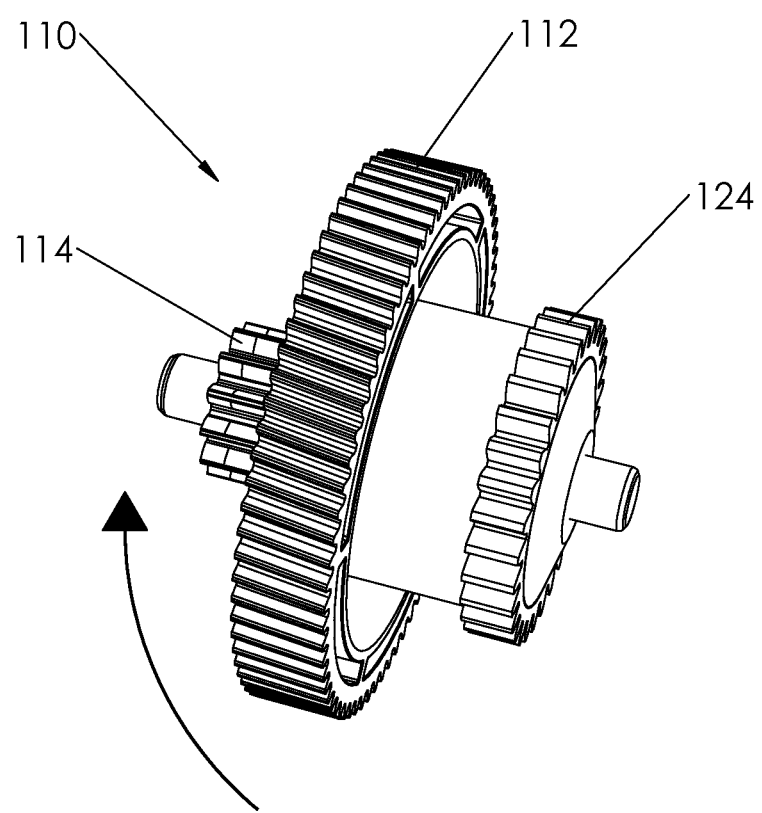
FIG. 17 illustrates a perspective view of a wrap spring clutch in accordance with one embodiment.
Figure 18:
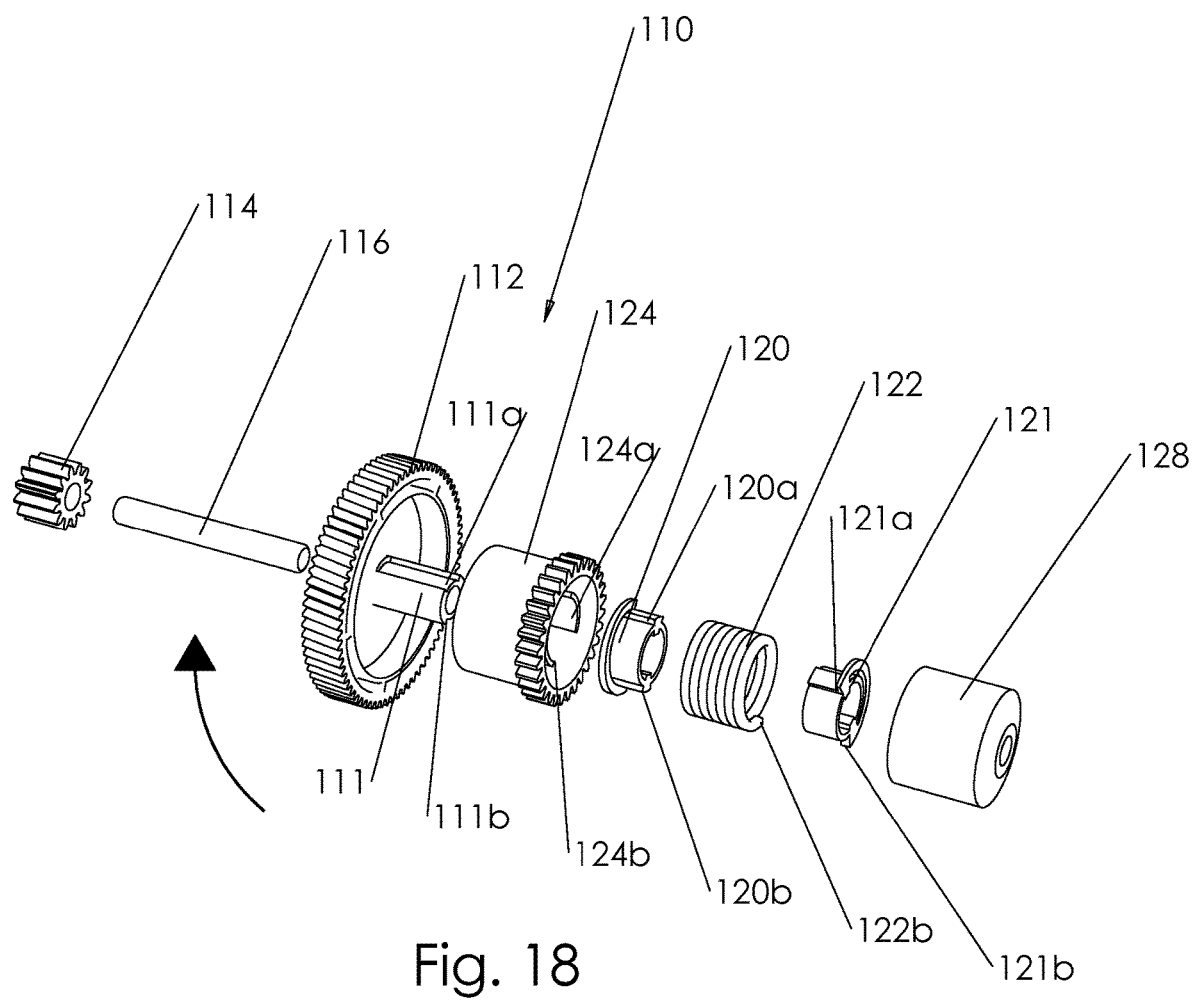
FIG. 18 illustrates an exploded view of the wrap spring clutch of FIG. 17 in accordance with one embodiment.
Figure 19:
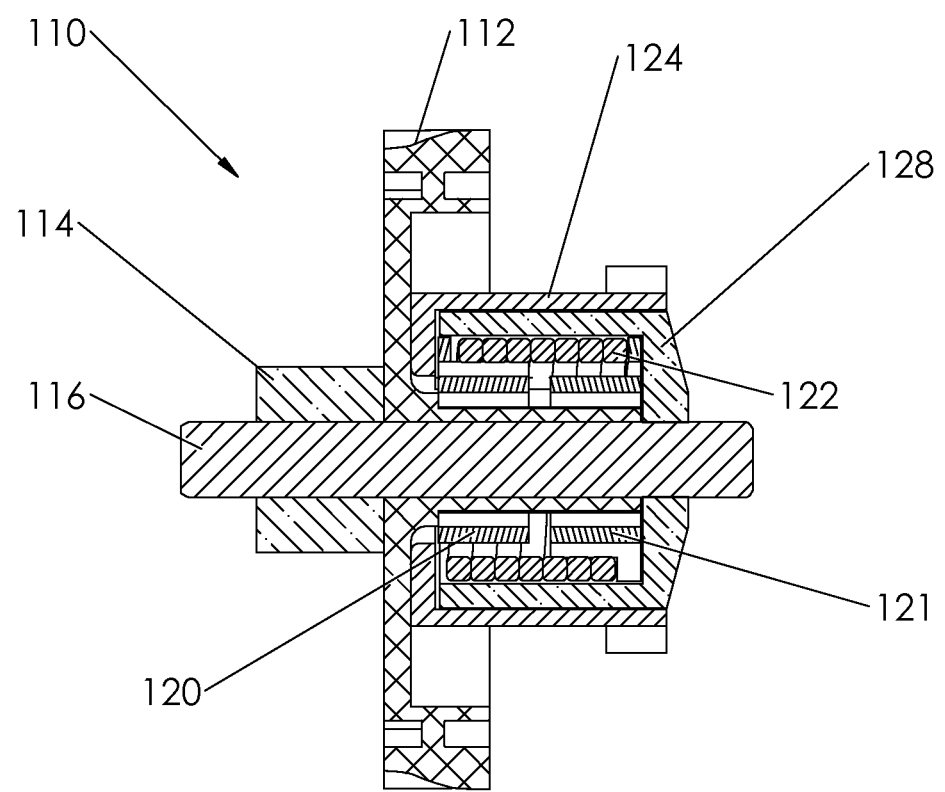
FIG. 19 illustrates a sectional view of the wrap spring clutch of FIGS. 17 and 18 in accordance with one embodiment.

FIG. 17 illustrates a wrap spring clutch 110 in accordance with one embodiment. FIG. 18 further illustrates an exploded view of wrap spring clutch 110, illustrating further components not visible in FIG. 17. FIG. 19 illustrates a sectional view of fully assembled wrap spring clutch 110. Whereas previous-described wrap spring clutches 10, 60 and 80 are wrap down configurations, wrap spring clutch 110 is configured as a wrap open input clutch and it operates with a bidirectional input rotation, both clockwise and counterclockwise.

Figure 20:
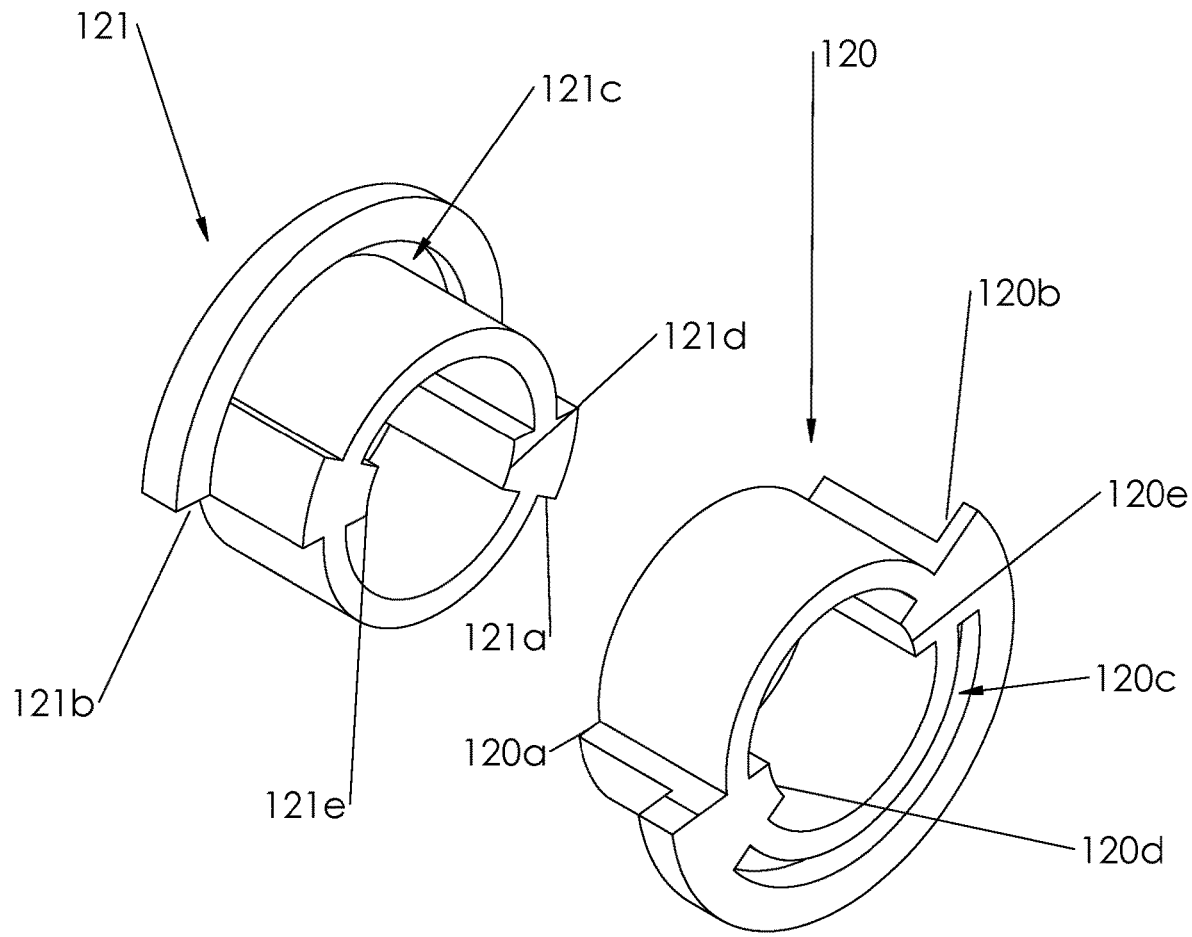
FIG. 20 illustrates a perspective view of drive hubs of the wrap spring clutch of FIGS. 17-19 in accordance with one embodiment.

In one embodiment, wrap spring clutch 110 includes an input 112 and an output 114. In one embodiment, a shaft 116 and an output hub 128 are coupled to output 114. A drive spline 111 extends from a center of input 112 and is fixed thereto, and shaft 116 extends through drive spline 111. Drive spline 111 includes first and second spline slots 111a/111b. In one embodiment, first and second drive hubs 120/121 are assembled over drive spline 111. FIG. 20 illustrates a further view of first drive hub 120. First drive hub 120 includes first drive surface 120a, second drive surface 120b, control slot 120c, first spline ridge 120d and second spline ridge 120e. Second drive hub 121 is similarly configured with a first drive surface 121a, second drive surface 121b, control slot 121c, first spline ridge 121d and second spline ridge 121e.

When wrap spring clutch 110 is assembled and first and second drive hubs 120/121 are assembled over drive spline 111, first spline ridge 120d and first spline ridge 121d are fit into first spline slot 111a and second spline ridge 120e and second spline ridge 121e are fit into second spline slot 111b. Accordingly, rotation of input 112 and drive spline 111 will also initially drive first and second drive hubs 120/121 in the same direction of rotation.

A wrap spring 122 is a helical-wound spring with a relaxed or equilibrium condition defining a relaxed external diameter. Wrap spring 122 is helically wrapped over first and second drive hubs 120/121, and includes first spring end 122a and second spring end 122b.

Output hub 128 is assembled over wrap spring 122 and has an internal hub diameter that is more than the external diameter of wrap spring 122 in its relaxed condition. Consequently, when wrap spring 122 in its relaxed condition is placed within output hub 128, output hub 128 can rotate over wrap spring 122 without interference therewith.

Figure 21:
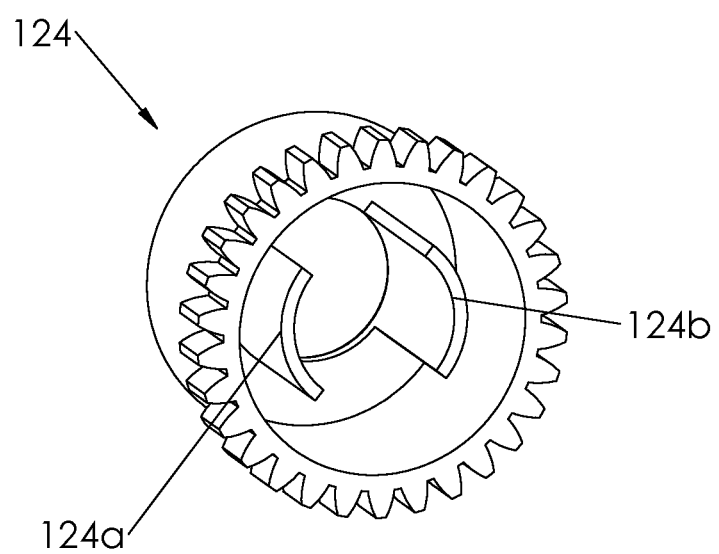
FIG. 21 illustrates a perspective view of a control of the wrap spring clutch of FIGS. 17-19 in accordance with one embodiment.

In one embodiment, a control 124 is provided over output hub 128 and wrap spring 122. FIG. 21 illustrates a further view of control 124, which in one embodiment has a first control finger 124a, a second control finger 124b and includes teeth on its outer perimeter. In one embodiment, when wrap spring clutch 110 is assembled, first control finger 124a is configured to slide into control slot 120c of first drive hub 120 and second control finger is configured to slide into control slot 121c of second drive hub 121. A drag force from a damper, such as rotary damper 30 illustrated in FIG. 5, translates a damping force to control 124 via the teeth on the periphery.

In operation, wrap spring clutch 110 of FIGS. 17-19 functions somewhat analogously to previous described bi-directional embodiments in FIGS. 1-12, except that wrap spring 122 wraps open rather than wrapping down when transitioning from a relaxed to a flexed state. When input 112 is rotated in the clockwise direction indicated in the arrow on FIGS. 17 and 18, drive spline 111 drives second drive hub 121 clockwise. This rotation of second drive hub 121 forces second drive surface 121b against second spring end 122b also rotating wrap spring 122 clockwise. When the amount of drag force on control 124 (such as from a rotary damper 30 in FIG. 5) is sufficient to overcome the energy stored in wrap spring 122, control 124 will push counterclockwise, and by virtue of first control finger 124a extending through control slot 120c of first drive hub 120, first drive hub 120 will push in a counterclockwise direction forcing second drive surface 120b against first spring end 122a, causing wrap spring 122 to transition from its equilibrium state to its flexed state and wrap open against the inner diameter of output 128. Since output 128 is fixed to output 114 via shaft 116, input 112 and output 114 rotate together.

When input 112 is no longer being rotated, the energy stored in wrap spring 122 is sufficient to overcome the amount of drag force on control 124 causing wrap spring 122 to transition from its flexed state to its equilibrium state and wrap down off the inner surface of output 128. In such case, input 112 and output 114 are disconnected and output 114 will rotate independent of input 112.

When input 112 rotates in the counterclockwise direction, opposite that indicated in the arrow on FIGS. 17 and 18, drive spline 111 drives first drive hub 120 counterclockwise. This rotation of first drive hub 120 forces first drive surface 120a against first spring end 122a also rotating wrap spring 122 counterclockwise. When the amount of drag force on control 124 (such as from a rotary damper 30 in FIG. 5) is sufficient to overcome the energy stored in wrap spring 122, control 124 will push clockwise, and by virtue of second control finger 124b extending through control slot 121c of second drive hub 121, second drive hub 121 will push in a clockwise direction forcing second drive surface 121b against second spring end 122b, causing wrap spring 122 to transition from its equilibrium state to its flexed state and wrap open against the inner diameter of output 128. Since output 128 is fixed to output 114 via shaft 116, input 112 and output 114 rotate together.

In each of the disclosed embodiments, there is only a single hub upon which the wrap spring wraps down or wraps open. None of the embodiments include an input hub onto which the input torque is applied. Accordingly, there is no transfer of the input torque through the main body of the wrap spring such as where a portion is wrapped on an input hub and a portion on an output hub. Rather, the input drives torque exclusively through the spring end. Such embodiments do away with the precise assembly required for a cross over spring clutch of prior embodiments. Previous embodiments also required the load precisely cross over from an input hub to an output hub, which of course is not an issue with present embodiments. The present embodiments result in both reduced part count and reduced complications in assembly.

The input engaging clutch has a rotatable input that is capable of being rotated and capable of being held stationary. The clutch has a wrap spring that is coupled to the input. The wrap spring has an equilibrium state and rotates with the input when the input is rotating. The clutch also has a damper mechanism that is coupled to the spring and to ground, such that the damper mechanism allows the spring to change from its equilibrium state to a flexed state-either wrapping open or wrapping down-when the input is rotated. In one embodiment, the clutch has a rotatable output that is positioned relative to the spring in such a way that the output rotates synchronously with the input when the spring is in its flexed state and rotates independently of the input when the spring is in its equilibrium state.

The clutch embodiments described are constructed as input engaging clutches, which are disengaged without input rotation and which engage the clutch upon rotation of the input. One skilled in the art understands that the embodiments are readily constructible as input disengaging clutches, which are engaged without input rotation and which disengage the clutch upon rotation of the input. This can be adjusted based on the size of the equilibrium state of the spring compared to the output. For the input disengaging embodiment, the spring is still engaged on one end with the input and on the damper with the other.

In addition to clutching, when an embodiment includes a slip clutch, another embodiment can be realized as a brake.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A wrap spring clutch comprising:
   a rotatable input configured with a slot;
   a spring comprising a first and a second end, an inner and an outer diameter and having an equilibrium state and a flexed state, the first end of the spring engaged with the slot in the input such that the spring rotates with the input, such that the input does not engage the inner or outer diameter of the spring and with an input torque transmitted exclusively through the first end when the input rotates;
   a damper mechanism engaged with the second end such that the damper mechanism causes the spring to change from its equilibrium to its flexed state when the input transitions from stationary to rotational, and such that the damper mechanism allows the spring to change from its flexed to its equilibrium state when the input transitions from rotational to stationary; and
   a rotatable output positioned relative to the spring such that the output alternately rotates independently and synchronously with the input when the spring changes between its flexed and equilibrium states.

2. The wrap spring clutch of claim 1 configured either as in input engaging clutch, wherein the rotatable output is positioned relative to the spring such that the output synchronously rotates with the input when the spring is in its flexed state and rotates independently of the input when the spring is in its equilibrium state, or configured as an input disengaging clutch, wherein the rotatable output is positioned relative to the spring such that the output independently rotates relative to the input when the spring is in its flexed state and rotates synchronously with the input when the spring is in its equilibrium state.

3. The wrap spring clutch of claim 1, wherein the rotatable output further comprises an output hub with which the spring engages when in its flexed state.

4. The wrap spring clutch of claim 3, wherein the output hub is the only hub with which the spring engages.

5. The wrap spring clutch of claim 3, wherein the spring engages the output hub by one of wrapping down or wrapping open on the output hub.

6. The wrap spring clutch of claim 1, wherein the first end is a spring toe, such that the input torque is transmitted exclusively through the spring toe when the input rotates.

7. The wrap spring clutch claim 1 further comprising a drag spring, the drag spring configured between the damper mechanism the second end of the spring to allow some slip therebetween.

8. A wrap spring clutch comprising:
   a rotatable input;
   a spring comprising a first and a second end and having an equilibrium state and a flexed state;
   a damper mechanism engaged with one of the first and second ends such that the damper mechanism causes the spring to change from its equilibrium to its flexed state when the input transitions from stationary to rotational, and such that the damper mechanism allows the spring to change from its flexed to its equilibrium state when the input transitions from rotational to stationary; and
   a rotatable output positioned relative to the spring such that the output alternately rotates independently and synchronously with the input when the spring changes between its flexed and equilibrium states;
   wherein the rotatable output comprises an output hub against which the spring engages and which is the only hub with which the spring engages such that the spring does not cross over more than one hub.

9. The wrap spring clutch of claim 8 configured as in input engaging clutch, wherein the rotatable output is positioned relative to the spring such that the output synchronously rotates with the input when the spring is in its flexed state and rotates independently of the input when the spring is in its equilibrium state.

10. The wrap spring clutch of claim 8 configured as in input disengaging clutch, wherein the rotatable output is positioned relative to the spring such that the output independently rotates relative to the input when the spring is in its flexed state and rotates synchronously with the input when the spring is in its equilibrium state.

11. The wrap spring clutch of claim 8, wherein the spring engages the output hub either when the input rotates clockwise or when the input rotates counterclockwise.

12. The wrap spring clutch of claim 8, wherein the spring engages the output hub only when the input rotates clockwise or only when the input rotates counterclockwise.

13. The wrap spring clutch of claim 8, wherein the damper mechanism is engaged with the spring through a control hub, the control hub comprising a slot configured to engage the first and second ends of the spring.

14. The wrap spring clutch of claim 13, wherein the damper mechanism is a rotary damper coupled to the control hub via one of a gear profile, splines and teeth.

15. The wrap spring clutch claim 8 further comprising a drag spring, the drag spring configured between the damper mechanism and the first and second ends of the spring to allow some slip therebetween.

16. A bi-directional wrap spring clutch comprising:
    a rotatable input with a first drive surface and a second drive surface;
    a spring with a first end and a second end and having an equilibrium state and a flexed state, the first end of the spring being driven by the first drive surface such that the spring rotates with the input when the input rotates in a clockwise direction and the second end of the spring being driven by the second drive surface such that the spring rotates with the input when the input rotates in a counterclockwise direction;
    a control with a damper, wherein the control engages the second end of the spring when the spring rotates in the clockwise direction and engages the first end of the spring when the spring rotates in the counter clockwise direction, and in each case when the control engages the spring end, the control with damper causes the spring to change from its equilibrium to its flexed state when the input transitions from stationary to rotational, and such that the control with damper allows the spring to change from its flexed to its equilibrium state when the input transitions from rotational to stationary; and
    a rotatable output positioned relative to the spring such that the output synchronously rotates with the input when the spring is in its flexed state, and rotates independently of the input when the spring is in its equilibrium state.

17. The bi-directional wrap spring clutch claim 16 further comprising a drag spring, the drag spring configured between the damper the first and second ends of the spring to allow some slip therebetween.

18. The bi-directional wrap spring clutch of claim 16, wherein the spring is engaged with the input through one of the first and second ends such that the spring rotates with the input and with an input torque transmitted exclusively through one of the first and second ends when the input rotates.

19. The bi-directional wrap spring clutch of claim 16, wherein the first and the second drive surfaces are comprised on a slotted driver coupled to the input.

* * * * *